June 23, 1936.    A. Y. DODGE    2,044,973
BRAKE
Filed Aug. 18, 1930
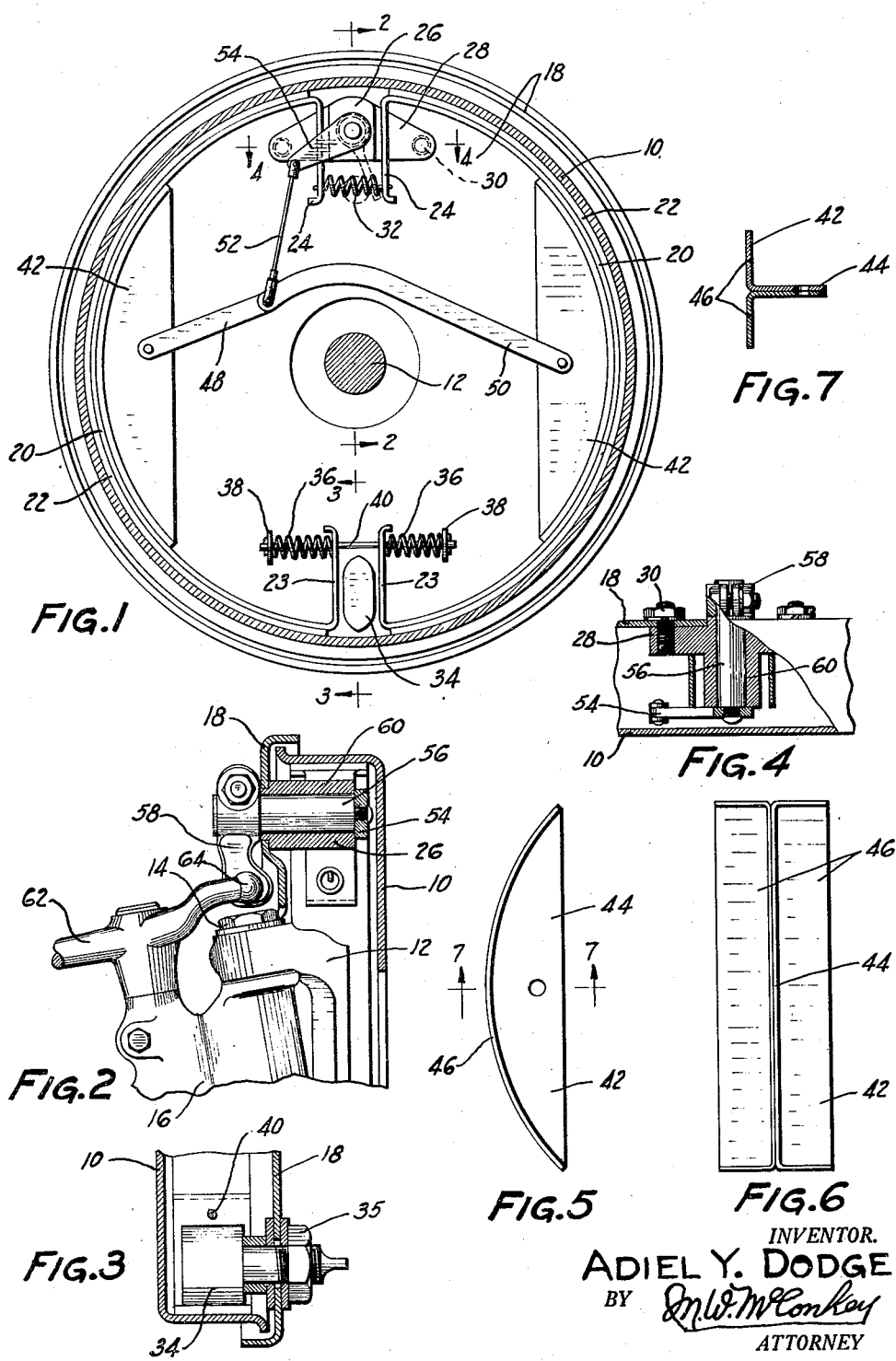
INVENTOR.
ADIEL Y. DODGE
BY M. W. McConkey
ATTORNEY Patented June 23, 1936

2,044,973

UNITED STATES PATENT OFFICE 2,044,973

BRAKE

Adiel Y. Dodge, South Bend, Ind., assignor to Bendix Brake Company, South Bend, Ind., a corporation of Illinois Application August 18, 1930, Serial No. 475,868

20 Claims. (Cl. 188—78)

This invention relates to brakes and is illustrated as embodied in an internal expanding brake for an automobile. An object of the invention is to provide a simple but very effective brake which can economically be manufactured on a large scale.

One important feature relates to the arrangement of a pair of friction members arranged opposite each other within the brake drum and which preferably can shift so that each of them can anchor at either end, and which are forced against the drum in such a manner as to transmit the braking torque to fixed stops, one of which is preferably adjustable to compensate for wear.

Other features of novelty relate to the construction of the friction members by combining a resilient or flexible band with a substantially rigid shoe to support the central portion of the band; to the construction of the shoe which engages the band; and to the arrangement of the brake-applying means. These and other features of novelty, including various structural details, will be apparent from the following description of one illustrative embodiment shown in the accompanying drawing, in which:

Figure 1 is a vertical section through the brake just inside the head of the brake drum and showing the friction members in side elevation;

Figure 2 is a partial vertical section on the line 2—2 of Figure 1 and showing the brake-applying means;

Figure 3 is a partial vertical section on the line 3—3 of Figure 1, showing the adjustable one of the anchoring stops;

Figure 4 is a partial horizontal section on the line 4—4 of Figure 1 and showing the brake-applying means;

Figure 5 is a side elevation of the rigid shoe which engages the back of the band;

Figure 6 is an inside elevation of the shoe of Figure 5; and

Figure 7 is a section through the shoe on the line 7—7 of Figure 5.

The brake selected for illustration comprises a drum 10 rotatably mounted on a wheel supported by a knuckle 12 which is swivelled by a king-pin 14 or the like at one end of a front axle 16. The open side of the brake drum is closed by a suitable support such as a backing plate 18.

Within the drum are arranged a pair of novel friction members, each approximately 180° long, and each of which is shown as comprising a flexible or resilient band 20 to which the brake lining 22 is riveted or otherwise secured, and the opposite ends of which are turned in to form portions 23 and 24 extending toward the center of the brake drum. Between the portions 24 at the top of the drum is arranged a stationary stop or abutment 26 forming part of a bracket 28 secured by bolts 30 to the backing plate, and against which the portions 24 of the bands are urged by a return spring 32 connected at its opposite ends to said portions. Between the portions 23 is arranged a fixed stop preferably in the form of an adjustable cam 34 clamped by a nut 35 to the backing plate 18, and which can be turned to make the necessary adjustment to compensate for the wear of the brake lining 22. Portions 23 are urged against the stop 34 by return springs 36 confined between the portions 23 and stop 38 on the end of a link 40 passing through the ends of these portions.

The central portion of each of the bands 20 and including about half the length of each band is made substantially rigid by a novel shoe 42, the construction of which is shown in some detail in Figures 5–7. As appears in these figures, each shoe 42 is built up of two L-section stampings welded or riveted or otherwise secured back to back to form a double-thickness stiffening web 44 and a pair of oppositely directed cylindrical flanges 46 engaging and riveted or otherwise secured to the rear face of the band 20.

The brake is applied by floating means illustrated as including a toggle made up of pivotally connected links 48 and 50, operated by an adjustable thrust link 52 pivotally connected to one end of an operating arm 54 on the inner end of a shaft 56, which shaft also has an operating crank arm 58 adjustably clamped on the end outside of the backing plate. The shaft 56 is journalled in a bearing 60 formed as an integral part of the member or stop 26. Arm 58 is operated to apply the brake by a lever 62 fulcrumed on the axle 16 and having at its end an integral ball 64, the center of which is arranged, when the brake is applied, in or immediately adjacent the axis of kingpin 14.

The brake is shown with the shoes applied, in Figure 1, but with the drum stationary, so that both of these shoes are drawn away from both of the stops 36 and 44. If the drum were urged in a clockwise direction, the friction member on the right would engage and anchor against the stop 34, while the friction member on the left would engage and anchor against the stop 26. If the drum were turning in a counter-clockwise direction, the friction member on the right would engage and anchor against the stop 26 and the friction member on the left would engage and anchor against the stop 34.

While one illustrative embodiment of the invention has been described in detail, it is not my intention to limit its scope to that particular embodiment or otherwise than by the terms of the appended claims.

I claim:

1. A brake comprising, in combination, a drum, a pair of fixed stops arranged on opposite sides of the drum, a pair of partly-flexible and partly-rigid friction members engageable with the drum and the flexible parts of which are arranged to be engageable with said stops, and floating means acting on the rigid portions of said friction means for forcing the friction members against the drum.

2. A brake comprising, in combination, a drum, a pair of partly-flexible and partly-rigid friction members within the drum and on opposite sides of the drum and each of which extends approximately 180°, a fixed stop at each side of the drum engageable with the flexible parts of said friction members, and means acting on the rigid portions of said friction means for forcing the friction members against the drum.

3. A brake comprising, in combination, a drum, a pair of friction members on opposite sides of the drum and each of which extends approximately 180°, a pair of fixed stops on opposite sides of the drum each of which is arranged between the corresponding ends of the friction members and one of which stops is adjustable to compensate for wear of the friction members, and means for forcing and applying the friction members against the drum, said friction members adapted to float into engagement with either side of said stops upon rotation of the drum in one direction or another and bearing against their respective stops in a direction substantially parallel with the general applying movement of said shoes.

4. A brake comprising, in combination, a drum, a pair of friction members on opposite sides of the drum and each of which extends approximately 180°, a pair of fixed stops on opposite sides of the drum each of which is arranged between the corresponding ends of the friction members and one of which stops is adjustable to compensate for wear of the friction members, said friction members being mounted so that they can shift in either direction to anchor against the opposite stops according to the direction of rotation of the drum, and means for forcing and applying the friction members against the drum and said friction members bearing against their respective stops in a direction substantially parallel with the general applying movement of said shoes.

5. A brake friction member comprising a band, in combination with a shoe secured to approximately one-half of said band and including a pair of L-section stampings secured back to back to form a double-thickness stiffening web and oppositely extending cylindrical flanges engaging the band.

6. A brake comprising, in combination, a drum, friction means having ends turned inwardly toward the center of the drum, a fixed stop between said inwardly turned ends, a member passing through said ends and provided with stops at its ends, and return springs sleeved on said member and confined between said stops and said inwardly turned ends and acting on said inwardly turned ends.

7. A brake comprising, in combination, a drum, a pair of flexible friction members arranged to float within the drum, stops arranged to anchor opposite ends of the friction members in opposite directions of the drum rotation and at least one of which is adjustable, and floating operating mechanism acting on a rigid shoe engaging each friction member intermediate its ends to urge the friction member against the drum.

8. A brake comprising, in combination, a drum, floating operating mechanism arranged within the drum acting on a rigid arcuate shoe adapted to be urged toward the drum, flexible friction means between the shoe and the drum and adapted to be urged by the shoe against the drum, and adjustable anchoring means for said friction means, said friction means extending at one end at least substantially beyond the shoe.

9. A brake comprising, in combination, a drum, floating operating mechanism arranged within the drum acting on a rigid arcuate shoe adapted to be urged toward the drum, flexible friction means between the shoe and the drum and adapted to be urged by the shoe against the drum, and adjustable anchoring means for said friction means, said friction means extending at both ends substantially beyond the shoe, and stops disposed to be engaged by both ends of said friction means depending upon the direction of drum rotation.

10. A brake comprising, in combination, a drum, brake friction means arranged to float within the drum including a flexible floating friction member approximately 180° in length and means adapted to hold it practically rigid for a substantial portion of its length, an anchoring member therefor, at least one of said members being adjustable to compensate for wear of the brake, and floating operating mechanism cooperating therewith to urge said friction member against the drum.

11. A brake comprising, in combination, a drum, brake friction means arranged to float therein and having a substantially rigid intermediate portion and flexible end portions, floating operating mechanism engaging said rigid portion, and stops adapted to be engaged by said flexible end portions to anchor the friction means within the drum and at least one of which is adjustable.

12. A brake comprising, in combination, a drum, flexible brake friction means arranged to float within the drum, stops adapted to be engaged by opposite ends of said friction means to anchor said means and at least one of which is adjustable, and floating operating mechanism acting on a rigid arcuate shoe engaging said friction means for a substantial portion of its length and adapted to urge it against the drum.

13. A brake comprising, in combination with a drum, a pair of shoes independently shiftable lengthwise so that each one anchors at opposite ends in opposite directions of drum rotation, anchoring means for the ends of said shoes, the anchor engaging ends of each shoe being approximately 180° apart and which means is adjustable to compensate for wear of both shoes without interfering with their lengthwise independent movement, and actuating means acting independent of said adjustable anchor, whereby both shoes may be applied equally, each of said shoes bearing again their respective anchors in a direction substantially parallel with the general applying movement of said shoes.

14. A brake comprising, in combination with a drum, a pair of shoes independently shiftable lengthwise so that each one anchors at opposite ends in opposite directions of drum rotation, two anchoring means having a relatively narrow circumferential dimension whereby the effective length of the shoes may approximate 180° one for the ends of the shoes at one side of the drum and the other for the ends of the shoes at the other side of the drum, and at least one of which means is adjustable to compensate for wear of both shoes without interfering with their lengthwise independent movement and without interfering with the other anchoring means, and actuating means acting independent of said adjustable anchor, whereby both shoes may be applied equally, each of said shoes bearing against their respective anchors in a direction substantially parallel to a line perpendicular to a line passing diametrically through the centers of said anchors.

15. A brake comprising in combination with a drum, a pair of shoes independently shiftable lengthwise so that each one anchors at opposite ends in opposite directions of drum rotation, anchoring means having a relatively narrow circumferential dimension, whereby the effective length of the shoes may approximate 180° for the ends of said shoes and which means is adjustable to compensate for wear of both shoes without interfering with their lengthwise independent movement and resilient means associated with each pair of adjacent ends adapted to hold each of the ends of each shoe in engagement with one of the anchors when the brake is in normal release position and cause said shoes to bear against said anchors in a direction substantially parallel with the general release movement of said shoes.

16. A brake comprising, in combination with a drum, a pair of shoes independently shiftable lengthwise so that each one anchors at opposite ends in opposite directions of drum rotation, anchoring means for the ends of said shoes and which means is adjustable to compensate for wear of both shoes without interfering with their lengthwise independent movement and substantially diametrical actuating means acting on the central portions of said shoes and pivoted thereto said shoe ends bearing against their respective anchors in a direction substantially parallel with a line passed through the center of said anchors and tangent to a concentric circle passing thru said center.

17. A brake comprising, in combination with a drum, a pair of shoes independently shiftable lengthwise so that each one anchors at opposite ends in opposite directions of drum rotation, two anchoring means one for the ends of said shoes at one side of the drum and the other for the ends of the shoes at the other side of the drum, and at least one of which means is adjustable to compensate for wear of both shoes without interfering with their lengthwise independent movement and without interfering with the other anchoring means, and actuating means diametrically arranged substantially at right angles to a line through the anchors.

18. A brake comprising, in combination with a drum, a pair of shoes independently shiftable lengthwise so that each one anchors at opposite ends in opposite directions of drum rotation, and two anchoring means one for the ends of said shoes at one side of the drum and the other for the ends of the shoes at the other side of the drum, and one of which means is adjustable to compensate for wear of both shoes without interfering with their lengthwise independent movement and without interfering with the other anchoring means and actuating means including a cross shaft passing through said other anchoring means.

19. A brake comprising, in combination with a drum, a pair of shoes independently shiftable lengthwise so that each one anchors at opposite ends in opposite directions of drum rotation, two anchoring means one for the ends of the shoes at one side of the drum and one for the ends of the shoes on the other side of the drum, and at least one of which means is adjustable to compensate for wear of both shoes without interfering with their lengthwise independent movement and without interfering with the other anchoring means, and resilient means adapted during brake release to resiliently maintain each of the brake shoes in engagement with both anchoring means said shoes bearing against their respective anchors in a direction substantially parallel with the general applying movement of said shoes.

20. A brake comprising, in combination with a drum, diametrically oppositely disposed anchoring means one of which is adjustable to take up wear, a pair of shoes independently shiftable lengthwise so that each one anchors at opposite ends in opposite directions of drum rotation, and means for spreading said shoes apart and applying them equally regardless of the adjustment of said anchor, said shoes bearing against their respective anchors in a direction substantially parallel with a line passed through the center of the anchoring means and tangent to a concentric circle passing thru said center.

ADIEL Y. DODGE.

CERTIFICATE OF CORRECTION.

Patent No. 2,044,973. June 23, 1936.

ADIEL Y. DODGE.

It is hereby certified that error appears in the printed specification of the above numbered patent requiring correction as follows: Page 2, second column, line 71, claim 13, for the word "again" read against, and page 3, second column, line 36, claim 19, after the word "means", second occurrence, insert the words connecting adjacent shoe ends and; and that the said Letters Patent should be read with these corrections therein that the same may conform to the record of the case in the Patent Office.

Signed and sealed this 11th day of May, A. D. 1937.

(Seal)

Henry Van Arsdale
Acting Commissioner of Patents.